Figure 1:
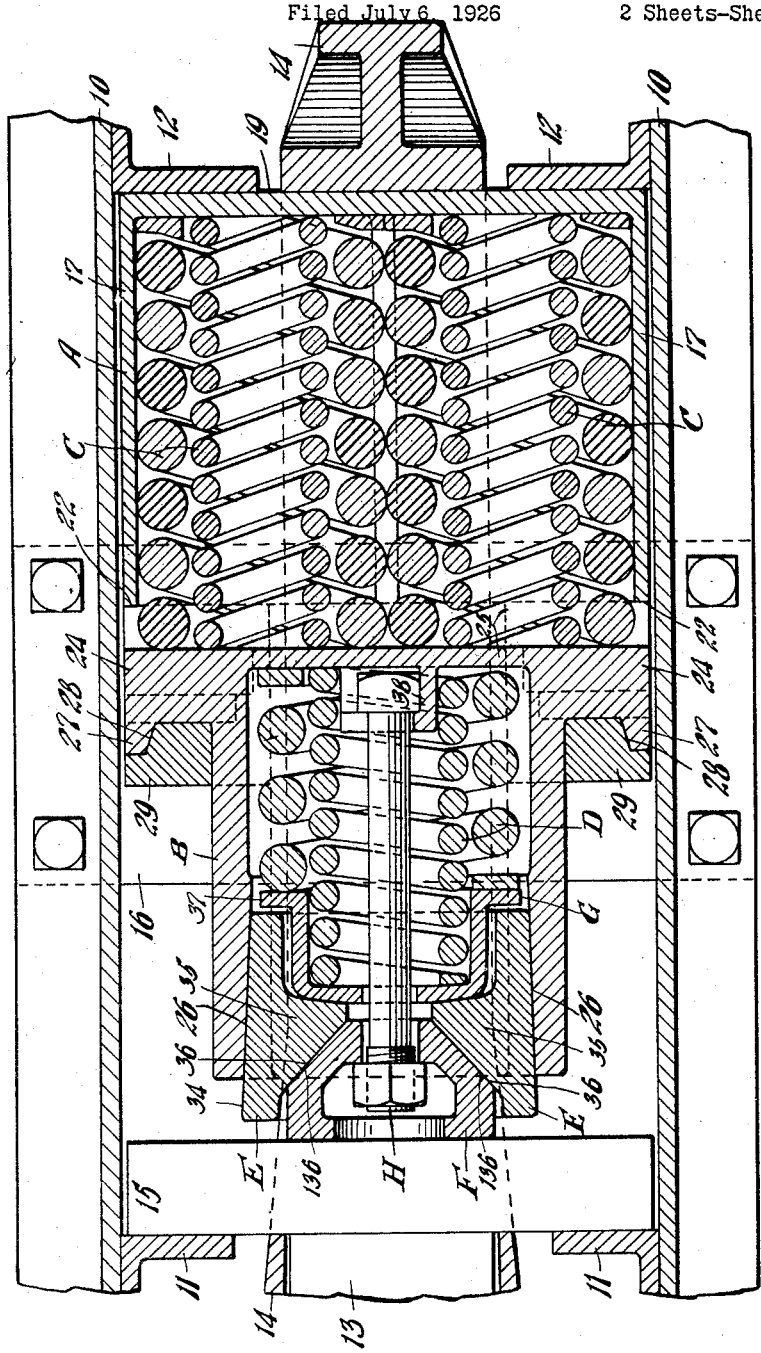

May 1, 1928. 1,667,799
J. F. O'CONNOR
FRICTION SHOCK ABSORBING MECHANISM
Filed July 6, 1926 2 Sheets-Sheet 2
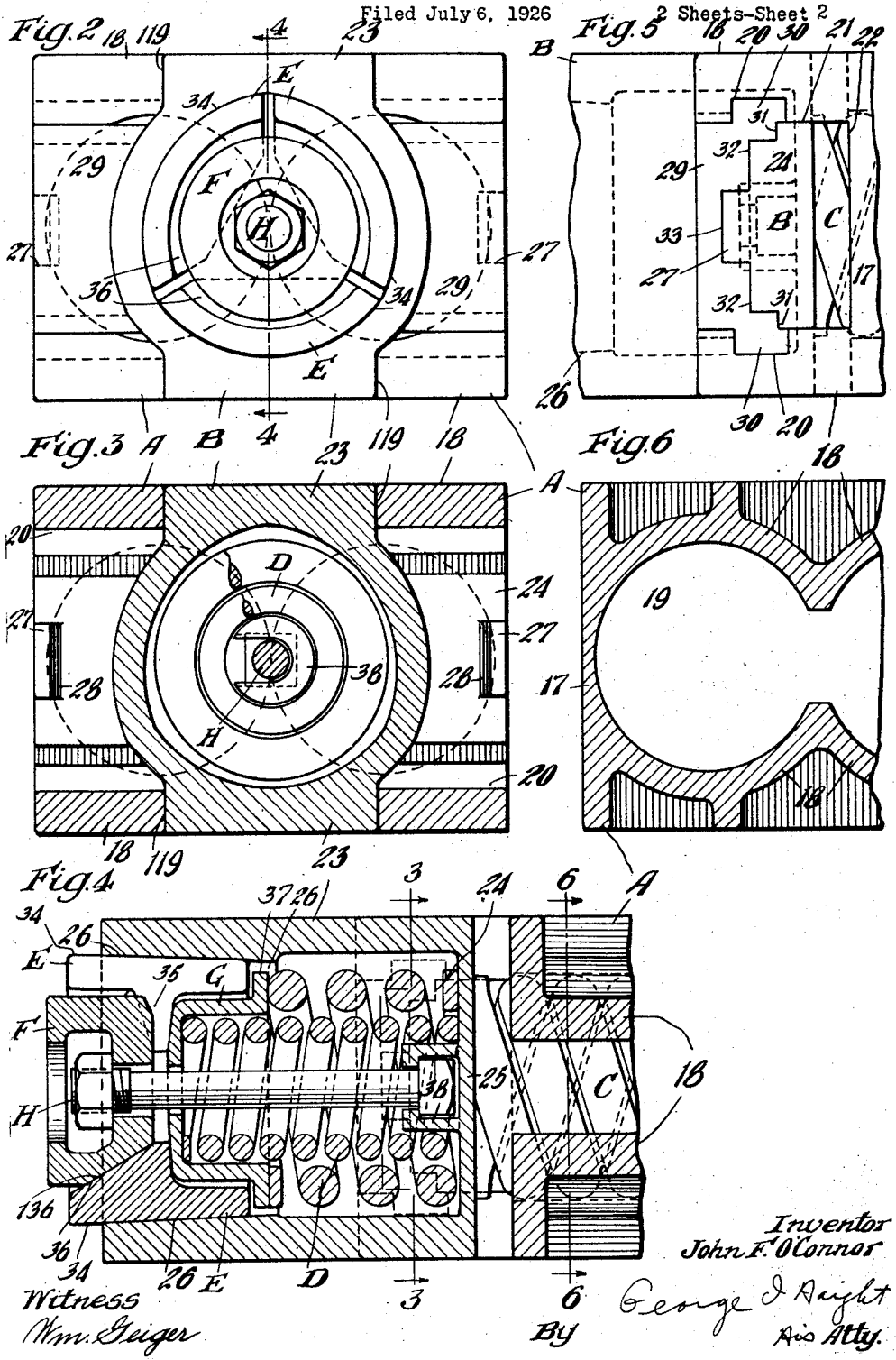

May 1, 1928.

J. F. O'CONNOR 1,667,799

FRICTION SHOCK ABSORBING MECHANISM

Filed July 6, 1926        2 Sheets-Sheet 1

Witness
Wm. Geiger

Inventor
John F. O'Connor
By George I. Haight
His Atty.

Patented May 1, 1928.

1,667,799

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 6, 1926. Serial No. 120,778.

This invention relates to improvements in friction shock absorbing mechanisms.

One object of the invention is to provide a friction shock absorbing mechanism of high capacity, especially adapted for railway draft rigging and particularly for passenger train equipment wherein there is provided, in effect, a free spring gear permitting easy starting of a train and always available for absorbing any normal shocks that may occur in the operation of a train, and combined therewith a friction mechanism as an emergency friction shock absorbing device available to absorb excessive or abnormal shocks, the action of the free spring and friction mechanism being blended to avoid abrupt change in rate of resistance.

Another object of the invention is to provide a combined spring and friction shock absorbing mechanism, including a main spring resistance of extra high capacity and a friction system provided with an independently acting spring resistance, wherein the respective springs are so proportioned and designed that the main spring and friction system will operate in sequence, the main spring being available to absorb all normal shocks and the friction system functioning as an emergency device to absorb excessive or abnormal shocks.

A more specific object of the invention is to provide a friction shock absorbing mechanism, including a spring cage and a friction shell having limited relative movement, a friction system cooperating with a shell and two independently acting spring resistance elements, one opposing relative movement of the shell and cage and the other opposing relative movement of the friction system and shell, thereby providing, in effect, a spring gear combined with a friction gear, wherein the respective springs are of such capacity as to provide successive operation of the spring and friction gears and a blending of the resistance offered.

A further object of the invention is to provide a friction shock absorbing mechanism including a spring cage and connected friction shell, wherein the parts have limited relative movement and the shell and cage have relatively large cooperating abutment surfaces whereby, when the mechanism is fully compressed, a combined column element of great strength is provided.

Other objects and advantages of the invention will more clearly appear from the description and claims hereinafter following.

In the drawings, forming a part of this specification, Figure 1 is a longitudinal, horizontal, sectional view of a portion of a railway draft rigging showing my improvements in connection therewith, the section through the shell and friction elements therewithin corresponding to two section planes at approximately 120° apart. Figure 2 is a front end elevational view of the shock absorbing mechanism proper. Figure 3 is a transverse, vertical, sectional view corresponding substantially to the line 3—3 of Figure 4. Figure 4 is a longitudinal, vertical, sectional view through the front end of the shock absorbing mechanism corresponding substantially to the line 4—4 of Figure 2. Figure 5 is a side elevational view of a portion of the friction shell and spring cage illustrating the manner of connecting these parts. Figure 6 is a transverse, vertical, sectional view, partly broken away, corresponding substantially to the line 6—6 of Figure 4, the main springs being omitted.

In said drawings, 10—10 indicate channel shaped center or draft sills of a car underframe, to the inner faces of which are secured front stops lugs 11—11 and rear stop lugs 12—12, of usual construction. The inner end portion of the drawbar is indicated by 13, the same having operatively associated therewith a yoke 14 of well known form. Within the yoke is disposed the shock absorbing mechanism proper, hereinafter more fully described and a front main follower 15. The yoke and parts contained therein are supported in operative position by a detachable saddle plate 16.

The improved shock absorbing mechanism proper, as shown, comprises broadly, a spring cage casting A; a friction shell B; a main spring resistance C; an additional spring resistance D; three friction shoes E—E; a wedge block F; a spring follower cap G; and a retainer bolt H.

The spring cage A is of generally rectangular box-like form having vertically disposed, longitudinally extending side walls 17—17, horizontally disposed top and bottom walls 18—18 and a transverse vertical rear end wall 19 cooperating with stop lugs 12 in the manner of the usual rear follower. As most clearly illustrated in Figure 6, the rear sections of the top and bottom walls 18 are formed so as to conform to the outline of the twin arranged double coiled main springs C. The top and bottom walls are preferably reinforced by longitudinally extending ribs as illustrated in Figure 6. At the forward end of the cage A, the top and bottom walls are centrally cut away as indicated at 119—119 to accommodate the rear end portion of the friction shell B. The extreme outer ends of the top and bottom walls at opposite sides of the cut away portions 119 are thickened as most clearly shown in Figures 2 and 5, the thickened portions being cut away on the inner sides as indicated at 20 in Figure 5 to provide guideways adapted to receive locking blocks hereinafter more fully described. The side walls 17—17 of the spring cage are cut away as indicated at 21 thereby providing vertically disposed inner abutment faces 22 at the opposite sides of the casing cooperating with the inner end of the friction shell B.

The friction shell B is of generally cylindrical form, as most clearly shown in Figures 1, 2 and 3 and is provided with top and bottom enlargements 23—23 working within the cutaway portions 119 of the top and bottom walls of the cage A. At the rear end, the friction shell B is provided with a pair of lateral extensions 24 serving as a follower element. The shell B has a transverse rear end wall 25 formed integral with the enlargements 24 and serving as an abutment for the inner end of the spring resistance D. The friction shell is also provided with three interior, longitudinally extending, true cylindrical friction surfaces 26—26 adapted to cooperate with the friction shoes E. The enlargements 24 are of such a height that they are accommodated for sliding movement in the cut away sections 21 of the side walls of the spring cage A, as most clearly shown in Figure 5. At the forward side the enlargements 24 are provided with lugs 27—27 adjacent the extreme outer edges thereof, the lugs being provided with beveled faces 28 on the inner sides thereof. The friction shell B is adapted to be assembled with the spring by inserting the rear end of the former longitudinally of the cage between the top and bottom walls, the enlargements 23 being entered within the cut away sections 119 of the top and bottom walls and the enlargements 24 being entered within the cut away sections 21 of the side walls.

In order to retain the friction shell in assembled relation with the spring cage casting, two locking blocks 29 are provided. The locking blocks are adapted to fit within the cut away portions of the side walls of the spring cage A and are each provided with top and bottom ribs 30—30 adapted to seat within the corresponding slots 20 of the top and bottom walls. At the inner end, each block is cut away as shown in Figure 5 to provide transversely extending vertical sets of shoulders 31—31 and 32—32 adapted to cooperate with similar shoulders on the front surfaces of the enlargements 24 at the rear end of the friction shell. Each locking block 29 is also provided with a notch 33 adjacent the outer edge thereof, adapted to cooperate with the corresponding lug 27 on the friction shell. Each notch 33 is provided with a beveled or inclined face adapted to cooperate with the face 28 of the corresponding lug 27. When the parts have been assembled and the spring cage is moved inwardly so that the shoulders on the enlargements 24 cooperating with the shoulders 31 on the locking blocks are in alinement with the inner end walls of the recesses 20 on the top and bottom walls of the spring cage, the two locking blocks 29 are inserted laterally within the openings 21 of the side walls of the spring cage in such a manner that the ribs 30 will be seated within the slots 20 of the top and bottom walls of the cage. It will be evident when the friction shell is in its outermost position, movement thereof will be limited by the enlargements 24 coming into abutment with the locking blocks 29. When the parts are in this position, the lugs 27 on the friction shell will engage within the notches of the blocks and hold the same against lateral outward movement. It is further pointed out that when the mechanism is in assembled position between the draft sills 10, accidental displacement of the locking blocks 29 will be positively prevented by the draft sills. If these blocks should become accidentally slightly displaced, proper centering of the same is assured by the beveled cooperating faces on the locking blocks and enlargements 24 of the friction shell.

The friction shoes E, are three in number and are preferably of like construction, each having an outer elongated cylindrical friction surface 34 adapted to cooperate with one of the friction surfaces 26 of the shell B. On the inner side, each shoe E is provided with a lateral enlargement 35 having a front wedge face 36 adapted to cooperate with the wedge member F. The rear end of the enlargement 35 of each shoe provides a transverse abutment face adapted to cooperate with the spring follower cap G. The spring follower cap G is of generally cup-shape having a relatively heavy annular flange 37 at the inner end thereof bearing on the outer relatively heavy coil of the spring resistance D. The inner coil of the spring resistance D, which is relatively lighter than the outer coil has the rear end thereof bearing on the end wall 25 of the friction shell and the front end thereof seated within the cup-like section of the cap G.

The wedge F, through which the pressure is transmitted, is in the form of a hollow casting having a flat front transverse bearing face engaging directly the inner surface of the front main follower 15. At its inner end, the wedge F is provided with three rearwardly and inwardly converging wedge faces 136 correspondingly inclined to and adapted to cooperate with the three wedge faces 36 of the shoes E.

The main spring resistance elements C are disposed at opposite sides of the spring cage and each member comprises a relatively heavy outer coil and a lighter inner coil having their opposite ends bearing respectively on the end wall 19 of the spring cage and the rear end of the friction shell B. The springs C are preferably placed under initial compression when the mechanism is assembled.

The parts of the friction system are held in assembled relation and of overall uniform length by the retainer bolt H having its opposite ends anchored to the rear wall of the friction shell B and the wedge member F, the head of the bolt being accommodated within a hollow lug 38 projecting forwardly from the rear end wall of the friction shell and having the nut at the front end thereof accommodated within the hollow portion of the wedge member F. The bolt is so adjusted as to place the spring resistance element D under initial compression. Due to the spring D being under initial compression, compensation for wear of the various friction and wedge faces is had.

The relative capacities of the spring resistance elements C and D is so proportioned and designed that there will be substantially no compression of the spring resistance elements D prior to the spring C being compressed to the limit of the extent of relative movement of the spring cage and friction shell.

Assuming a buffing or compression action applied to the mechanism, the operation is as follows:—

As the wedge F is forced inwardly, the initial action will be a wedging action between the same and the shoes E, forcing the shoes laterally outwardly against the shell B. When the shoes have been wedged against the friction surfaces of the shell, further inward movement of the main follower 15 and the wedge F will cause the friction shell B to be moved inwardly in unison with the shoes F thereby compressing the main spring resistance element C. This action will continue until the lost motion between the friction shell and spring cage is taken up, whereupon further movement of the friction shell will be limited by engagement thereof with the faces 22 of the spring cage. During the further compression of the mechanism, the friction shoes will be compelled to move inwardly with reference to the friction shell B effecting compression of the spring resistance D. During this time, frictional resistance will be obtained in addition to the spring resistance by the sliding action of the shoes E on the friction surfaces of the shell B. The described action will continue either until the actuating force is reduced or the front follower comes into abutment with the front end of the friction shell, whereupon the actuating force will be transmitted directly through the friction shell to the spring cage and the corresponding stop lugs to the draft sills, thereby providing a combined stop column element of great strength and preventing either of the springs from being unduly compressed. As hereinbefore pointed out, the springs are so proportioned that the free spring action of the gear and the action of the friction system will be blended so as to avoid abrupt shocks. It is also pointed out that the main springs C are preferably of such a capacity as to provide for free spring action to absorb all the usual shocks encountered in passenger service.

With the arrangement described, it is evident that an easy initial spring action is obtained at all times with an ultimate high capacity and at the same time the preliminary spring resistance is operative independently of the high capacity resistance means and is available at all times to absorb the lighter shocks.

From the preceding description, it will be evident that the gear which I have provided has a very high spring capacity. This high spring capacity particularly adapts the gear for passenger cars, the spring being of such a capacity as to entirely absorb all the ordinary shocks incident to starting and stopping of the train and also overbalance the tractive effort of the locomotive during the time that the train is in motion so that cushioning of the car body is assured during motion. The shock absorbing capacity of the spring resisted friction mechanism of the gear is thus always available for absorbing the heavier shocks during the time the train is in motion in addition to unusually heavy shocks in starting and stopping. My improved gear entirely overcomes the danger of the gear not functioning due to non-release of the friction mechanism, a difficulty sometimes encountered in connection with the ordinary friction gear.

I have herein shown and described what I now consider the preferred manner of car-

I claim:

1. In a friction shock absorbing mechanism adapted for railway draft riggings subject to the tractive force approximating the maximum tractive effort of a standard passenger locomotive, the combination with a friction shell and friction elements cooperable therewith; of a spring cage; a spring resistance within the shell; and a spring resistance within said cage, the resistance of said last named spring while opposing relative movement of the shell and cage being in excess of the maximum sustained tractive effort of a standard locomotive, said shell and cage having a predetermined amount of lost motion therebetween, said shell, elements and first named spring resistance being movable bodily as a unit relative to the cage to effect compression of the second named spring resistance to the extent of said lost motion.

2. In a friction shock absorbing mechanism adapted for railway draft riggings of standard passenger equipment subject to a sustained tractive force approximating the sustained maximum tractive effort of the locomotive of said standard equipment, the combination with a friction shell having a rear end wall and friction elements cooperable with the shell; a spring cage, said shell and cage having a predetermined amount of lost motion therebetween; a spring resistance within the shell co-acting with the friction elements; and a main spring resistance within the cage and cooperating with the end wall of the shell, said last named spring having, while opposing movement of the shell and cage a resisting capacity in excess of the sustained maximum tractive effort of said standard locomotive and being compressible independently of said first named spring to the extent of the lost motion between the shell and the cage.

3. In a friction shock absorbing mechanism adapted for railway draft riggings, subject to a tractive force approximating the maximum tractive effort of a standard passenger locomotive and having when subjected to a force equal to said tractive force, a normal compression stroke less than the full compression stroke of the mechanism, the combination with a friction shell having a fixed abutment wall; of a spring cage, said shell and cage having a limited amount of relative movement; a plurality of friction elements within the shell cooperable therewith; a spring resistance within the shell cooperating with the friction elements, said spring resistance being interposed between said shoes and the abutment wall; and a main spring resistance interposed between the abutment wall and the rear end of the cage, the capacity of said main spring while opposing movement of said shell and cage being such as to absorb all normal shocks to which the gear is subjected.

4. In a shock absorbing mechanism, the combination with a spring cage and a friction shell having limited relative movement; of a friction system within the shell; spring means opposing relative movement of the shell and cage; and means for detachably connecting the shell to the cage comprising locking means detachably secured to the cage, said locking means and shell having abutment elements thereon for limiting the outward movement of the shell with reference to the cage, said locking means being held in locking position by the expansive action of the spring means.

5. In a railway draft rigging, the combination with draft sills; of a shock absorbing mechanism interposed between the draft sills including a spring cage and a friction shell, said cage and shell having limited relative movement; a friction system within the shell; means for yieldingly resisting relative movement of said system and shell; means for yieldingly opposing relative movement of the shell and cage; and means for detachably connecting the shell to the cage and permitting said limited relative movement thereof, said means including locking blocks cooperating with the shell and cage, outward movement of said blocks being prevented by engagement with the draft sills, said blocks having means thereon cooperating with the friction shell for preventing accidental displacement of the blocks when the mechanism is in full release.

In witness that I claim the foregoing I have hereunto subscribed my name this 30th day of June 1926.

JOHN F. O'CONNOR.